United States Patent
Strahle (10) Patent No.: US 10,183,218 B1
(45) Date of Patent: Jan. 22, 2019

(54) DETACHABLE JOYSTICK FOR VIDEO GAME CONTROLLER

(71) Applicant: Performance Designed Products LLC, Burbank, CA (US)

(72) Inventor: Bradley M. Strahle, Crestline, CA (US)

(73) Assignee: Performance Designed Products LLC, Burbank, CA (US)

( * ) Notice: Subject to any disclaimer, the term of this patent is extended or adjusted under 35 U.S.C. 154(b) by 53 days.

(21) Appl. No.: 15/649,014

(22) Filed: Jul. 13, 2017

(51) Int. Cl.
*A63F 13/24* (2014.01)
*A63F 13/23* (2014.01)

(52) U.S. Cl.
CPC .............. *A63F 13/24* (2014.09); *A63F 13/23* (2014.09); *A63F 2300/1043* (2013.01)

(58) Field of Classification Search
CPC ....................................................... G09G 5/08
USPC ....................................................... 345/161
See application file for complete search history.

(56) References Cited

U.S. PATENT DOCUMENTS

| | | | |
|---|---|---|---|
| 4,296,773 A | 10/1981 | Harshman | |
| 4,492,830 A | 1/1985 | Kim | |
| 4,558,609 A | 12/1985 | Kim | |
| 4,721,834 A | 1/1988 | Mark | |
| 4,857,881 A | 8/1989 | Hayes | |
| 5,883,690 A * | 3/1999 | Meyers | A63F 13/02 345/157 |
| 6,085,608 A | 7/2000 | Santoro, Jr. | |
| 6,128,974 A | 10/2000 | Hughes | |
| 6,307,486 B1 | 10/2001 | Takeda et al. | |
| 8,044,934 B2 * | 10/2011 | Arai | G05G 25/04 345/161 |

(Continued)

FOREIGN PATENT DOCUMENTS

| | | |
|---|---|---|
| JP | 2013-176457 A | 9/2013 |
| TW | 496181 | 7/2002 |
| WO | WO 09038483 A1 | 3/2009 |

OTHER PUBLICATIONS

International Search Report and Written Opinion dated Sep. 4, 2018, received in PCT Patent Application No. PCT/US2018/038540.

*Primary Examiner* — Dmitry Suhol
*Assistant Examiner* — Ankit Doshi
(74) *Attorney, Agent, or Firm* — Knobbe, Martens, Olson & Bear LLP (57) ABSTRACT

A removable joystick for use with a video game controller includes a base shaft that is coupled to a joystick unit in the housing of the video game controller so that the proximal end of the base shaft extends to a location at or below an outer surface of the housing. A top shaft assembly is removably coupleable to the base shaft. The top shaft assembly includes a top shaft with a proximal end that removably couples to a joystick ball. The top shaft assembly also includes a collar that is spring loaded and movably coupled to the top shaft and has a flange that extends outward from the outer surface of the collar. The top shaft assembly removably couples to the base shaft via a quick disconnect assembly. When the top shaft assembly is disconnected from the base shaft, the flange of the collar engages and retains a dust cover disposed over the collar to inhibit misplacement or loss of the dust cover. This assembly facilitates travel with the video game controller by allowing decoupling of the joystick while preventing misplacement or loss of the dust cover.

14 Claims, 8 Drawing Sheets

(56) References Cited

U.S. PATENT DOCUMENTS

| | | | |
|---|---|---|---|
| 9,242,722 B2 | 1/2016 | Buoy | |
| 9,710,072 B1 * | 7/2017 | Strahle | G06F 3/033 |
| 2007/0262959 A1 | 11/2007 | Gu | |
| 2016/0361634 A1 * | 12/2016 | Gassoway | A63F 13/24 |

* cited by examiner

DETACHABLE JOYSTICK FOR VIDEO GAME CONTROLLER

BACKGROUND

Field

The present invention is directed to video game controllers, and more particularly to a video game controller with a detachable joystick.

Description of the Related Art

Video gaming is very popular and has become increasingly complex, requiring video game controllers with multiple inputs (e.g., buttons, joysticks) that can be actuated (e.g., pressed, pivoted, etc.) to activate functions within the video game. As the inputs are actuated, electrical signals are generated, processed and/or transmitted to a gaming console to which the controller connects. The console operates the video game at least in part based on the signals it receives from the controller. There are different gaming consoles in the market, and each console may use a different type of controller (e.g., having different types or combination of inputs) or accommodate the use of multiple types of controllers.

Some game controllers are designed for particular use in fighting games or arcade style games. Such controllers can have an arcade like joy stick and multiple buttons, and a base or housing that allows the user to optionally rest his or her wrists on the housing of the controller while actuating the controls (e.g., the joy stick and/or buttons). Though such controllers are portable, they are often much larger than typical hand held controllers and the joystick that sticks out of the body of the controller makes it difficult to store the controller when traveling as it does not easily fit in a typical backpack, messenger bag or suitcase. Moreover, when placed in a travel bag (e.g., back pack, messenger bag, suitcate), the joystick sticking out of the controller housing can result in pressure exerted on the joystick head, which can result in damage to the joystick and/or the controller. To address these problems, removable joysticks have been developed for use with such controllers, to allow the controller to better fit in a travel bag. However, such removable joysticks are still deficient. For example, the dust cover is not retained when the joystick is removed, which results in the dust cover being misplaced or lost, which can negatively affect the operation of the controller (e.g., due to ingress of dust, liquid or other matter into the controller via the opening the dust cover normally covers, which can cause the joystick actuator to malfunction or fail.

SUMMARY

Accordingly, there is a need for an improved video game controller with a removable joystick that solves the problems discussed above.

In accordance with one aspect, a removable joystick for use with a video game controller is provided. The removable joystick includes a base shaft coupleable to a joystick unit in the video game controller. The removable joystick also comprises a top shaft assembly removably coupleable to the base shaft. The top shaft assembly includes a top shaft with a proximal end that optionally removably couples to a joystick ball. The top shaft assembly also includes a collar that is spring loaded and movably coupled to the top shaft and has a flange that extends outward from the outer surface of the collar. The top shaft assembly removably couples to the base shaft via a quick disconnect connection (e.g., ball-lock connection). When the top shaft assembly is disconnected from the base shaft, the flange of the collar engages and retains a dust cover disposed over the collar to inhibit misplacement or loss of the dust cover. This assembly facilitates travel with the video game controller by allowing decoupling of the joystick while preventing misplacement or loss of the dust cover.

In accordance with another aspect, a removable joystick assembly for use with a video game controller is provided. The removable joystick assembly comprises a base shaft with a circumferential recess at a proximal end of the base shaft and a top shaft assembly removably coupleable to the base shaft. The top shaft assembly comprises a top shaft having a central bore and comprising a threaded proximal end configured to removably couple to a joystick ball, a circumferential slot at a location between the proximal end and a distal end of the top shaft configured to removably receive a clip, and a plurality of openings defined in a distal wall portion of the top shaft that are configured to movably retain metal balls therein. The top shaft assembly also comprises a collar movably coupled over the top shaft by a spring disposed between the clip on the top shaft and an inner shoulder in the collar. The collar comprises a proximal inner surface with a first diameter that defines an annular gap between the top shaft and the collar that receives the spring, the first diameter being greater than a diameter of an outer surface of the top shaft. The collar also comprises an intermediate inner surface with a second diameter different than the first diameter and configured to contact an outer surface of the top shaft at the location of the plurality of openings to bias the balls in the openings radially inward relative to the distal wall portion of the top shaft. The collar also comprises a distal inner surface with a third diameter greater than the second diameter and configured to be spaced from the an outer surface of the top shaft at the location of the plurality of openings to allow the balls in the openings to more radially outward relative to the distal wall portion of the top shaft. The collar also comprises a flange extending radially outward from a distal portion of the collar. The spring biases the collar toward a distal position where the intermediate inner surface biases the balls in the openings radially inward and into the circumferential recess of the base shaft to couple the top shaft assembly and the base shaft. When the collar is pulled proximally, the distal inner surface is spaced from the plurality of openings so that the balls move radially out of the circumferential recess thereby decoupling the top shaft assembly from the base shaft. The flange on the collar is configured to engage a dust cover disposed over collar to retain the dust cover when the top shaft assembly is decoupled from the base shaft.

In accordance with another aspect, a kit for a removable joystick assembly for use with a video game controller is provided. The kit comprises a base shaft with a circumferential recess at a proximal end of the base shaft, and a top shaft assembly removably coupleable to the base shaft. The top shaft assembly comprises a top shaft having a threaded proximal end, a circumferential slot at a location between the threaded proximal end and a distal end of the top shaft having a clip disposed therein, a plurality of openings defined in a distal wall portion of the top shaft, and a plurality of metal balls movably retained in the plurality of openings. The top shaft assembly also comprises a collar movably coupled over the top shaft, a spring disposed between the clip on the top shaft and an inner shoulder in the collar to allow spring loaded movement of the collar relative to the top shaft between a distal position and a proximal position, the collar having a flange extending radially outward from a distal portion of the collar. The spring is configured to bias the collar toward a distal position so that the collar biases the balls in the openings radially inward and into the circumferential recess of the base shaft to intercouple the top shaft and the base shaft. When the collar is pulled proximally, an inner surface of the collar is spaced from the plurality of openings so that the balls move radially out of the circumferential recess to decouple the top shaft assembly from the base shaft. The flange is configured to engage a dust cover disposed over collar to retain the dust cover when the top shaft assembly is decoupled from the base shaft.

In accordance with another aspect, a video game controller and a removable joystick assembly are provided in combination. A base shaft has a circumferential recess at a proximal end of the base shaft and a distal end coupled to a joystick unit in the housing of the video game controller. A top shaft assembly is removably coupleable to the base shaft. The top shaft assembly comprises a top shaft having a threaded proximal end removably coupleable to a joystick ball, a circumferential slot at a location between the threaded proximal end and a distal end of the top shaft having a clip disposed therein, a plurality of openings defined in a distal wall portion of the top shaft, and a plurality of metal balls movably retained in the plurality of openings. The top shaft assembly also comprises a collar movably coupled over the top shaft, a spring disposed between the clip on the top shaft and an inner shoulder in the collar to allow spring loaded movement of the collar relative to the top shaft between a distal position and a proximal position, the collar having a flange extending radially outward from a distal portion of the collar. The spring is configured to bias the collar toward a distal position so that the collar biases the balls in the openings radially inward and into the circumferential recess of the base shaft to intercouple the top shaft and the base shaft. When the collar is pulled proximally, an inner surface of the collar is spaced from the plurality of openings so that the balls move radially out of the circumferential recess to decouple the top shaft assembly from the base shaft. The flange is configured to engage a dust cover disposed over collar to retain the dust cover when the top shaft assembly is decoupled from the base shaft, a proximal end of the base shaft disposed at or below a top surface of the housing.

DETAILED DESCRIPTION

Figure 1:
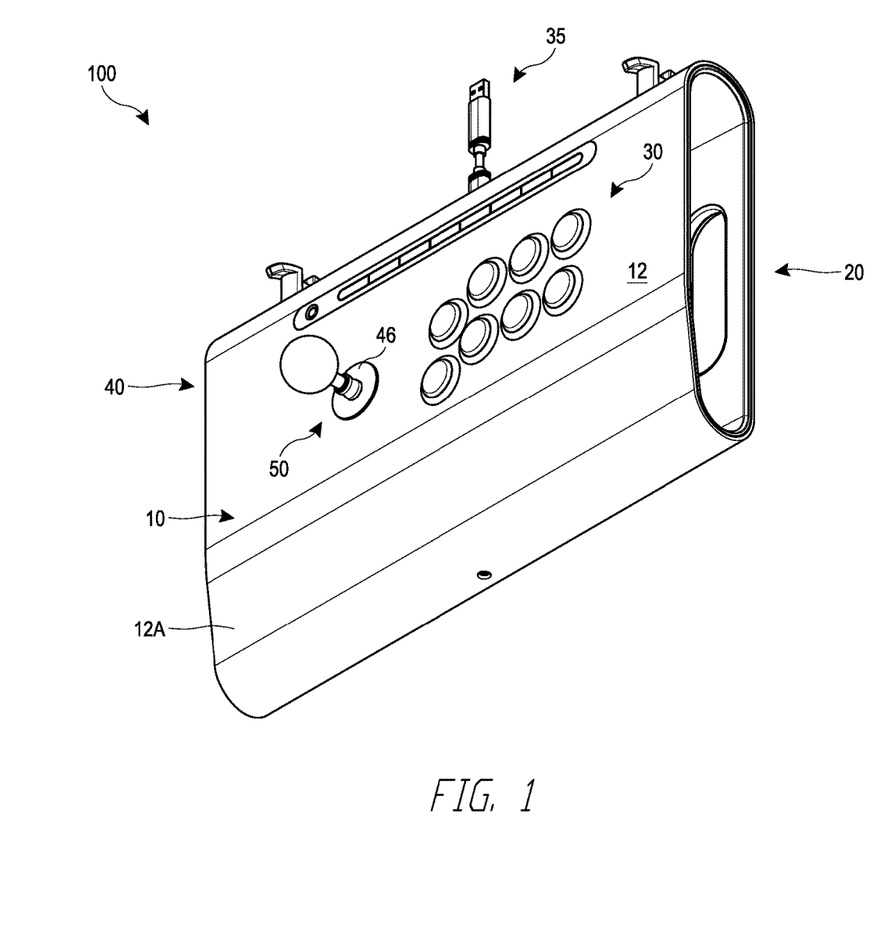
FIG. 1 is a top perspective view of a video game controller including a removable joystick.
Figure 2:
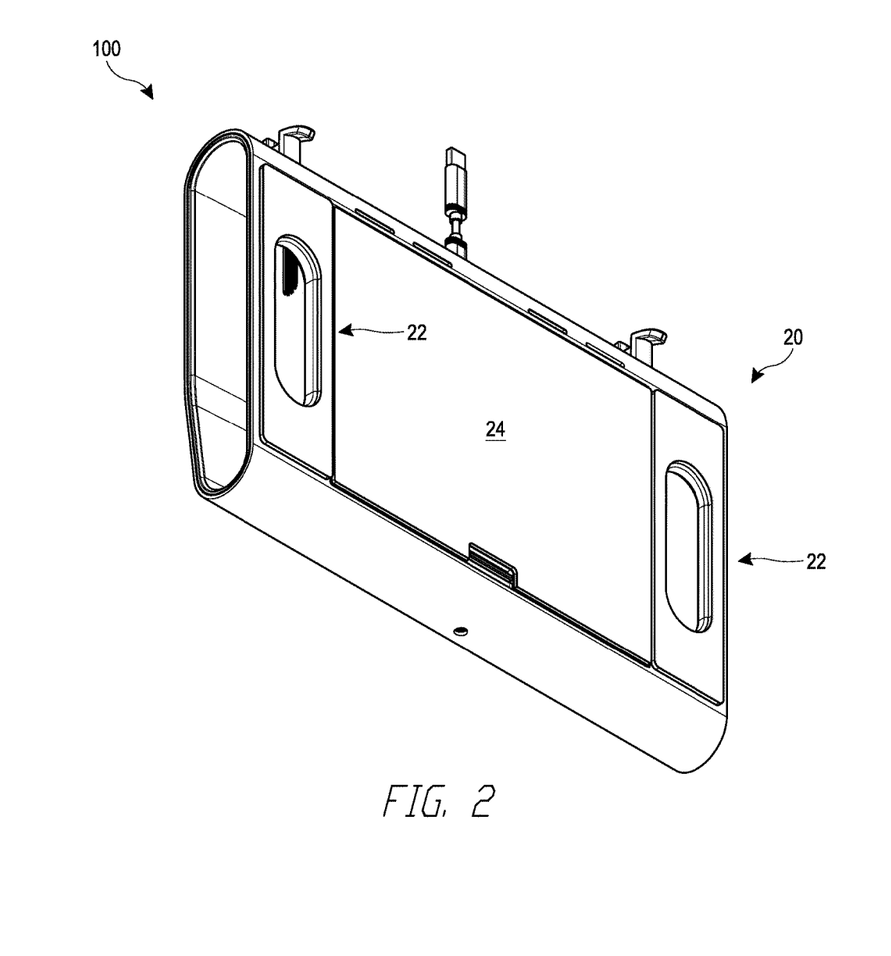
FIG. 2 is a bottom perspective view of the video game controller of FIG. 1.
Figure 3:
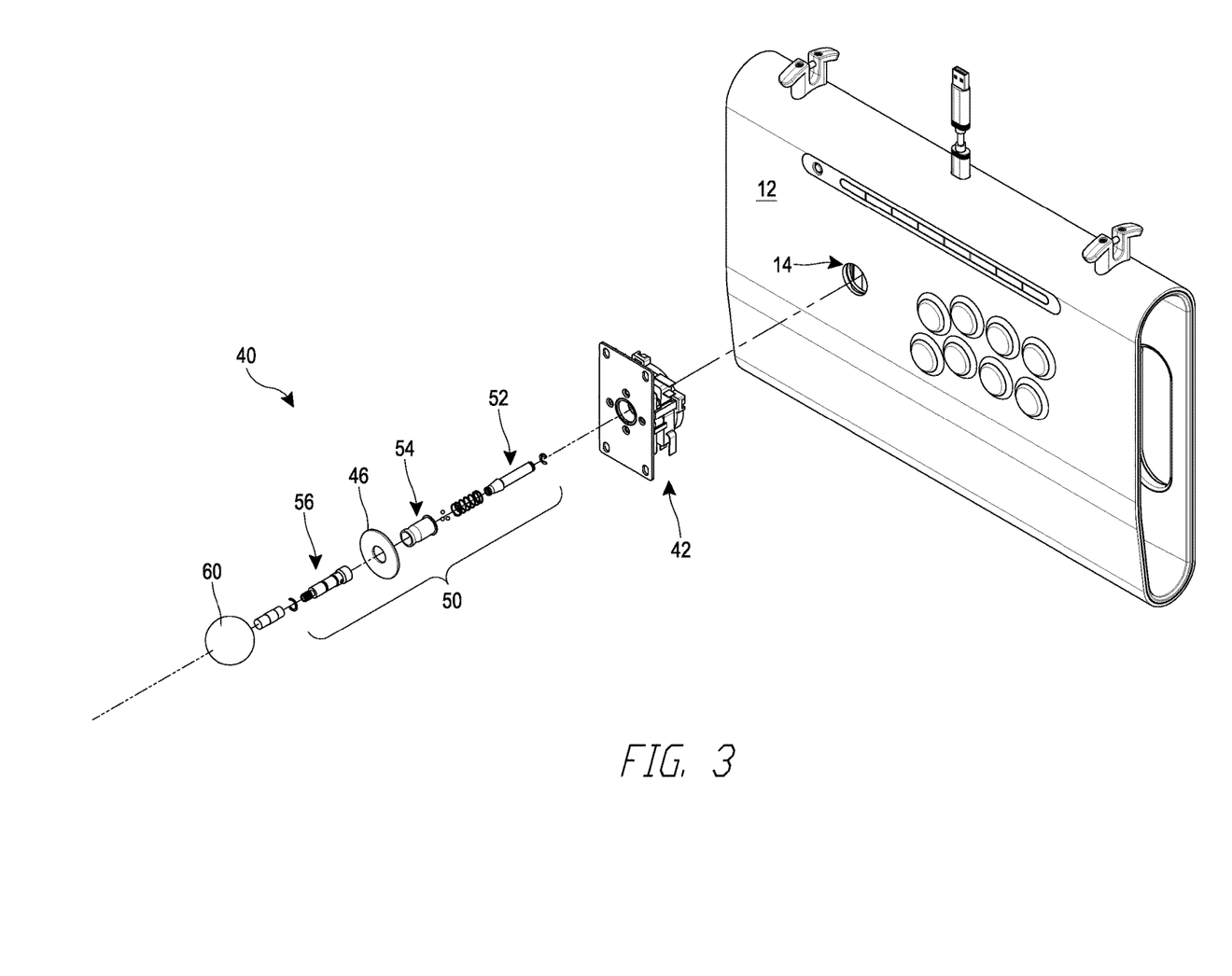
FIG. 3 is an exploded view of the video game controller of FIG. 1.

FIGS. 1-3 show a video game controller 100 (the "controller 100") that can be removably coupled to a video game unit (e.g., video game console), via a connector 35 (e.g., which can optionally couple to a cable that couples to a video game console). The video game controller 100 can be used with fight video games or arcade style video games. The controller 100 has a housing 10 with a top surface 12 that has a portion 12a on which the user can optionally rests their wrists while operating the controller 100. The controller 100 can also have a rear surface 20 and optionally have one or more handles 22 defined (e.g., by openings) in the rear surface 20 with which the user can grab the housing 10. The rear surface 20 can also optionally have a removable bottom cover 24 to access the electronics in the housing 10.

The controller 100 can optionally have one or more buttons 30 on the top surface 12 for actuating one or more functions of the video game during operation. The controller 100 also have a joystick unit 40 that includes a joystick assembly 50. The user can pivot the joystick assembly 50 to actuate a function of the video game during operation. A dust cover 46 is disposed about the joystick assembly 50 and adjacent the top surface 12 of the housing 10. The dust cover 12 covers an opening 14 in the housing 10 within which the joystick assembly 50 pivots to inhibit ingress of dust and foreign material into the housing 10 via the opening 14.

Figure 4:
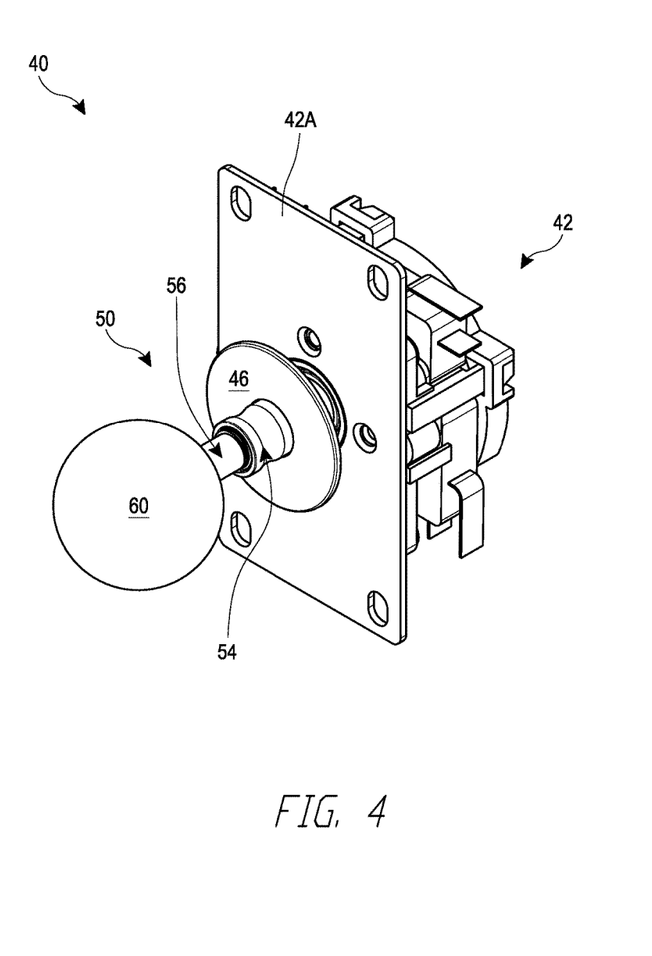
FIG. 4 is a perspective view of the removable joystick assembly attached to the joystick actuator.
Figure 5:
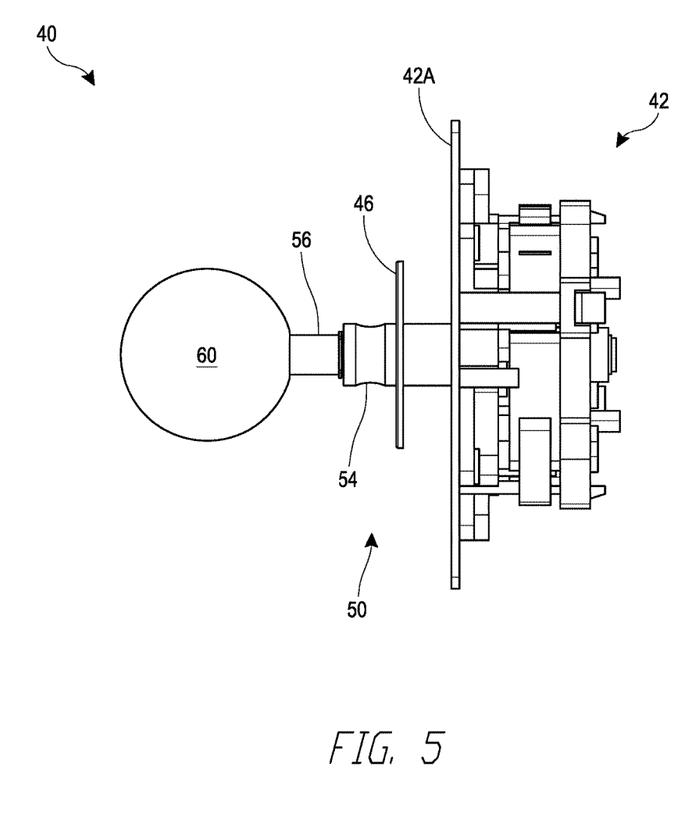
FIG. 5 is a side view of the removable joystick assembly attached to the joystick actuator.
Figure 6:
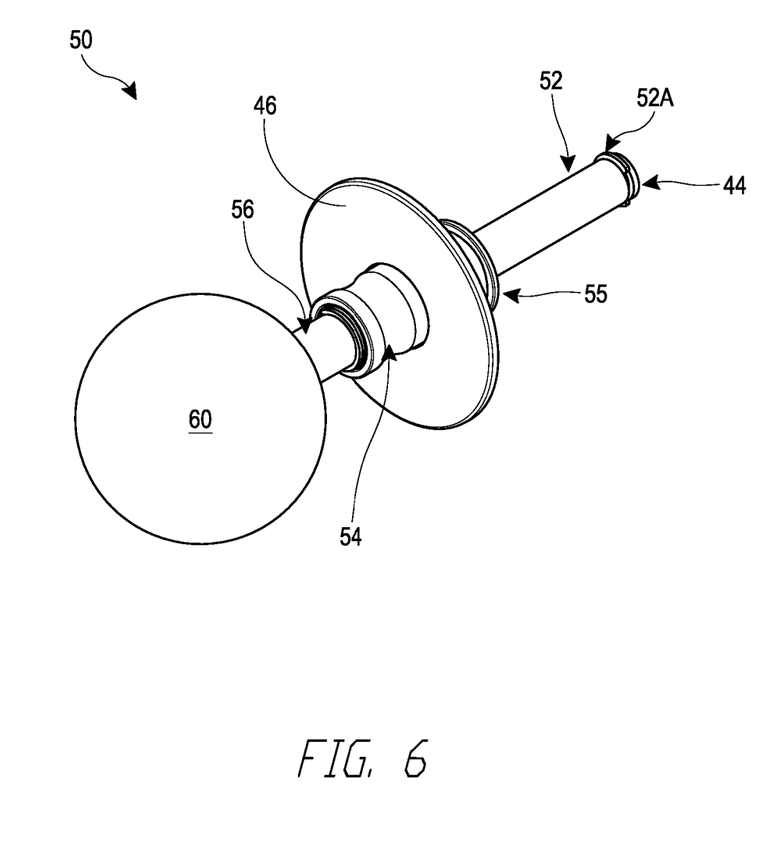
FIG. 6 is a perspective view of the joystick assembly.
Figure 7:
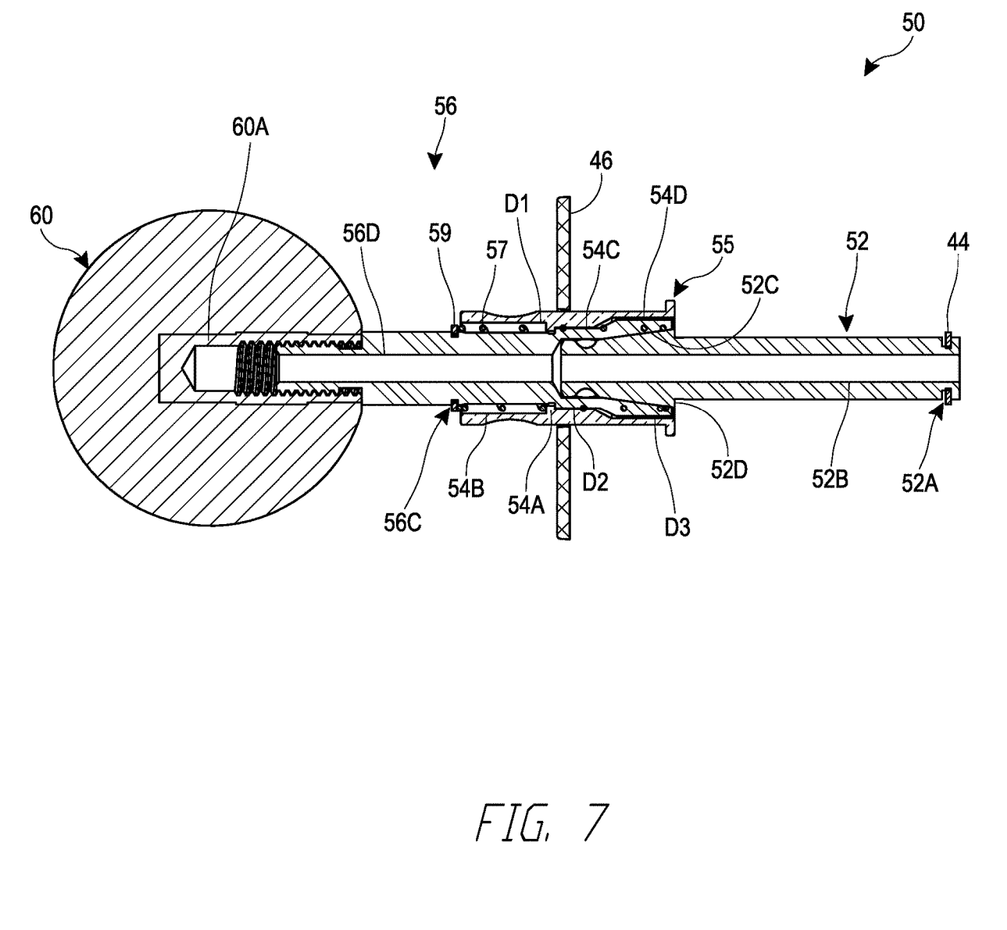
FIG. 7 is a cross-sectional side view of the joystick assembly.
Figure 8:
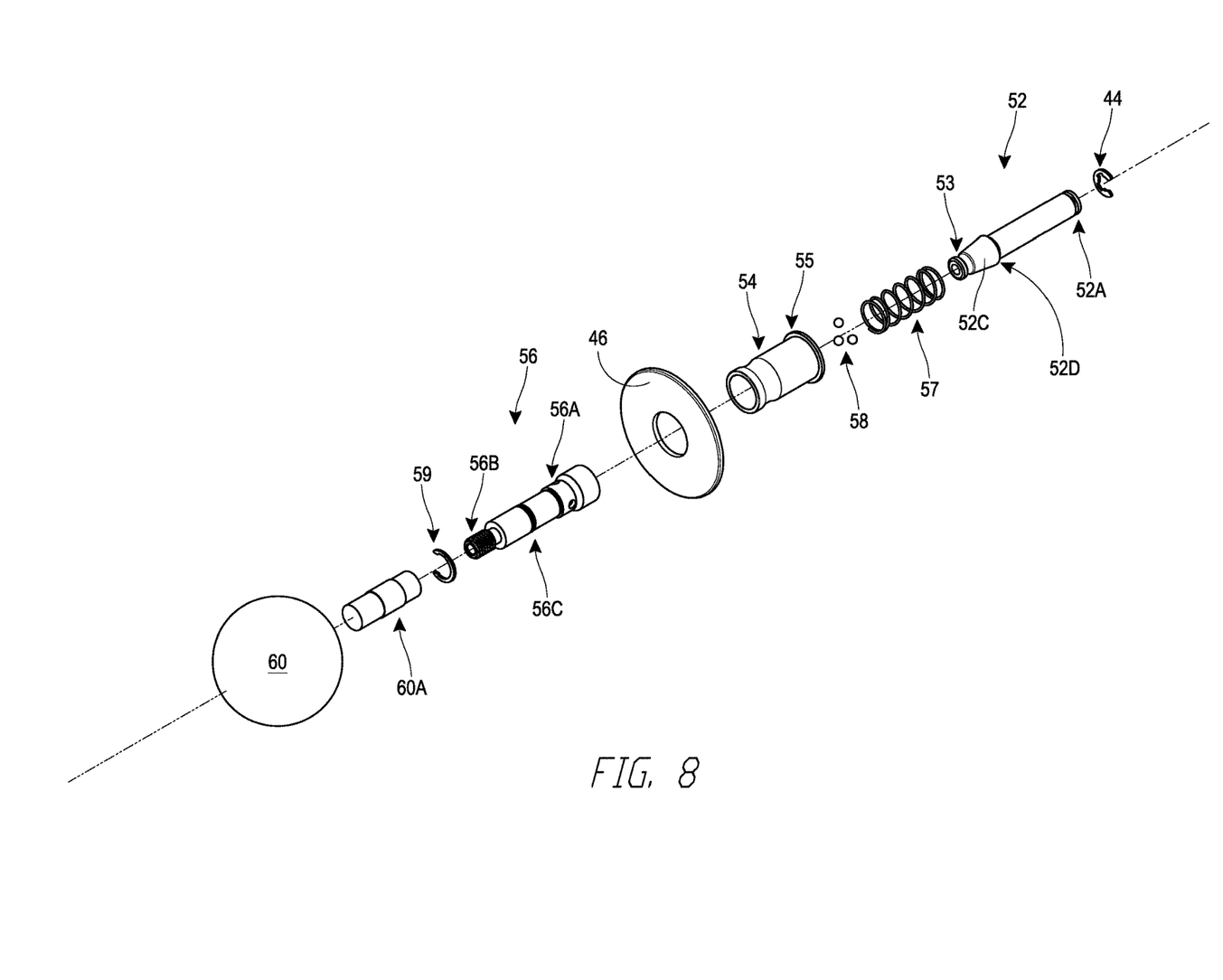
FIG. 8 is an exploded view of the joystick assembly.

FIGS. 3-5 show the joystick unit 40 in greater detail. The joystick unit 40 includes an actuator 42 that is disposed in the housing 10. The actuator 42 has a mounting plate 42a that can be coupled to the housing so that the mounting plate 42a faces an underside of the top surface 12 (e.g., the mounting plate 42a is fastened to an underside of the top surface 12). The joystick unit 40 also includes a joystick assembly 50 that couples to the actuator 42. The joystick assembly 50 is also illustrated in FIGS. 6-8

The joystick assembly 50 includes a base shaft 52 that can be coupled to the actuator 42 with a clip 44 (e.g., e-clip) that extends in a slot 52A at a distal end of the base shaft 52. The base shaft 52 can have a bore 52B that extends along its length, and can also have a circumferential recess 53 near a proximal end of the base shaft 52. The base shaft 52 can have a conical surface 52C adjacent the circumferential recess 53 that extends to a shoulder 52D.

The joystick assembly 50 also includes a collar 54 with a flange 55, where the collar 54 is movably mounted onto a top shaft 56 to define a quick release or quick disconnect fitting (e.g., a ball-lock quick disconnect). The flange 55 can optionally extend radially outward from the collar 54 by a distance of between about 0.5 mm and about 3 mm, such as about 1 mm or about 1.2 mm. The collar 54 can have a shoulder 54A that extends radially inward from an inner surface of the collar 54, a proximal cylindrical section 54B with a first inner diameter D1, an intermediate cylindrical section 54C with a second inner diameter D2, and a distal cylindrical section 54C with a third inner diameter D3. Diameter D1 and Diameter D3 are greater than diameter D2, and diameter D3 is optionally greater than diameter D1.

A spring 57 can be disposed over at least a portion of the top shaft 56 and between the top shaft 56 and the collar 54 and allows the collar 54 to be spring loaded relatively to the top shaft 56. As best shown in FIG. 7, the spring 57 is disposed between a clip (e.g., e-clip) 59 disposed in a recess 56C of the top shaft 56 and the shoulder 54A of the collar 54. The collar 54 can move from a distal biased position to a proximal position to allow the top shaft 56 to decouple from the base shaft 52. The top shaft 56 can have a central bore 56D with one or more openings 56A that movably retain metal balls 58 therein, allowing them to move radially by a certain amount that allows the top shaft 56 to couple to and decouple from the base shaft 52, as further described below. The top shaft 56 can also have a threaded portion 56B that removably threads on to a ball 60 (e.g., threads into a threaded portion 60A of the ball 60).

In use, when the collar 54 is in the biased position and the top shaft 56 is disposed over at least a portion of the base shaft 52, the balls 58 slide into the circumferential recess 53 of the base shaft 52 to intercouple the top shaft 56 to the base shaft 52. When the collar 54 is slid toward the proximal position (acting against the spring force), the intermediate cylindrical section 54C slides out of contact with the surface of the top shaft 56, allowing the balls 58 to move at least partially into the openings 56A in the top shaft 56 and out of the circumferential recess 53 of the base shaft 52 as the top shaft 56 is pulled away from the base shaft 52. Therefore, the top shaft 56, with the ball 60 attached thereto, and the collar 54 can be decoupled from the base shaft 52 to facilitate travel of the controller 100. Optionally, when the collar 54 and top shaft 56 are decoupled from the base shaft 52, the base shaft 52 does not protrude from the opening 14 of the housing 10 (e.g., the base shaft 52 extends to a proximal end that is at or below a plane of the top surface 12), thereby making it easy for the controller 100 to fit into a back pack, travel bag or suitcase and inhibit damage to the controller 100 or joystick during travel.

Advantageously, as the collar 54 and top shaft 56 are decoupled from the base shaft 52, the flange 55 of the collar 54 engages a surface of the dust cover 46 so that the dust cover 46 is retained on the collar 54. This advantageously inhibits (e.g., prevents) the misplacement or loss of the dust cover 46 while the top shaft 56 and collar 54 are decoupled from the base shaft 52, such as during storage or travel of the controller 100.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A removable joystick assembly for use with a video game controller, comprising:
   a base shaft with a circumferential recess at a proximal end of the base shaft; and
   a top shaft assembly removably coupleable to the base shaft, comprising
      a top shaft having a central bore and comprising a threaded proximal end configured to removably couple to a joystick ball, a circumferential slot at a location between the proximal end and a distal end of the top shaft configured to removably receive a clip, and a plurality of openings defined in a distal wall portion of the top shaft that are configured to movably retain metal balls therein, and
      a collar movably coupled over the top shaft by a spring disposed between the clip on the top shaft and an inner shoulder in the collar, the collar comprising
         a proximal inner surface with a first diameter that defines an annular gap between the top shaft and the collar that receives the spring, the first diameter being greater than a diameter of an outer surface of the top shaft,
         an intermediate inner surface with a second diameter different than the first diameter and configured to contact an outer surface of the top shaft at the location of the plurality of openings to bias the balls in the openings radially inward relative to the distal wall portion of the top shaft,
         a distal inner surface with a third diameter greater than the second diameter and configured to be spaced from the an outer surface of the top shaft at the location of the plurality of openings to allow the balls in the openings to more radially outward relative to the distal wall portion of the top shaft, and
         a flange extending radially outward from a distal portion of the collar,
      wherein the spring biases the collar toward a distal position where the intermediate inner surface biases the balls in the openings radially inward and into the circumferential recess of the base shaft to couple the top shaft assembly and the base shaft, and wherein when the collar is pulled proximally the distal inner surface is spaced from the plurality of openings so that the balls move radially out of the circumferential recess thereby decoupling the top shaft assembly from the base shaft, the flange on the collar configured to engage a dust cover disposed over collar to retain the dust cover when the top shaft assembly is decoupled from the base shaft.

2. The assembly of claim 1, wherein a distal portion of the base shaft includes a slot configured to receive a clip thereon.

3. The assembly of claim 1, wherein the base shaft comprises a conical surface adjacent the circumferential recess.

4. The assembly of claim 1, wherein the base shaft has a central bore that extends therethrough.

5. The assembly of claim 1, wherein the collar comprises a recess on an outer surface of the collar configured to facilitate gripping of the collar by a user's fingers.

6. The assembly of claim 1, wherein the flange extends radially outward from a distal portion of the collar by a distance of about 1 mm.

7. A kit for a removable joystick assembly for use with a video game controller, comprising:
   a base shaft with a circumferential recess at a proximal end of the base shaft; and
   a top shaft assembly removably coupleable to the base shaft, the top shaft assembly comprising
      a top shaft having a threaded proximal end, a circumferential slot at a location between the threaded proximal end and a distal end of the top shaft having a clip disposed therein, a plurality of openings defined in a distal wall portion of the top shaft, and a plurality of metal balls movably retained in the plurality of openings, and
      a collar movably coupled over the top shaft, a spring disposed between the clip on the top shaft and an inner shoulder in the collar to allow spring loaded movement of the collar relative to the top shaft between a distal position and a proximal position, the collar having a flange extending radially outward from a distal portion of the collar,
   wherein the spring is configured to bias the collar toward a distal position so that the collar biases the balls in the openings radially inward and into the circumferential recess of the base shaft to intercouple the top shaft and the base shaft, and wherein when the collar is pulled proximally an inner surface of the collar is spaced from the plurality of openings so that the balls move radially out of the circumferential recess to decouple the top shaft assembly from the base shaft, the flange configured to engage a dust cover disposed over collar to retain the dust cover when the top shaft assembly is decoupled from the base shaft.

8. The kit of claim 7, further comprising a joystick ball removably coupleable to the threaded proximal end of the top shaft.

9. The kit of claim 7, further comprising a clip configured to engage a slot in a distal portion of the base shaft to facilitate coupling of the base shaft to the video game controller.

10. The kit of claim 7, wherein the base shaft comprises a conical surface adjacent the circumferential recess.

11. The kit of claim 7, wherein the base shaft has a central bore that extends therethrough.

12. The kit of claim 7, wherein the collar comprises a recess on an outer surface of the collar configured to facilitate gripping of the collar by a user's fingers.

13. The kit of claim 7, wherein the flange extends radially outward front a distal portion of the collar by a distance of about 1 mm.

14. In combination, a video game controller comprising a housing on which a user can rest their wrists while operating the controller and a removable joystick assembly, comprising:

a base shaft with a circumferential recess at a proximal end of the base shaft and a distal end coupled to a joystick unit in the housing; and a top shaft assembly removably coupleable to the base shaft, comprising a top shaft having a threaded proximal end removably coupleable to a joystick ball, a circumferential slot at a location between the threaded proximal end and a distal end of the top shaft having a clip disposed therein, a plurality of openings defined in a distal wall portion of the top shaft, and a plurality of metal balls movably retained in the plurality of openings, and a collar movably coupled over the top shaft, a spring disposed between the clip on the top shaft and an inner shoulder in the collar to allow spring loaded movement of the collar relative to the top shaft between a distal position and a proximal position, the collar having a flange extending radially outward from a distal portion of the collar, wherein the spring is configured to bias the collar toward a distal position so that the collar biases the balls in the openings radially inward and into the circumferential recess of the base shaft to intercouple the top shaft and the base shaft, and wherein when the collar is pulled proximally an inner surface of the collar is spaced from the plurality of openings so that the balls move radially out of the circumferential recess to decouple the top shaft assembly from the base shaft, the flange configured to engage a dust cover disposed over collar to retain the dust cover when the top shaft assembly is decoupled from the base shaft, a proximal end of the base shaft disposed at or below a top surface of the housing.

\* \* \* \* \*

UNITED STATES PATENT AND TRADEMARK OFFICE
CERTIFICATE OF CORRECTION

PATENT NO. : 10,183,218 B1
APPLICATION NO. : 15/649014
DATED : January 22, 2019
INVENTOR(S) : Bradley M. Strahle

Page 1 of 1

It is certified that error appears in the above-identified patent and that said Letters Patent is hereby corrected as shown below:

In the Claims

On Column 9, Line 17: In Claim 13, change "front" to --from--.

Signed and Sealed this
Sixteenth Day of April, 2019

Andrei Iancu
*Director of the United States Patent and Trademark Office*